United States Patent [19]

Rodden

[11] Patent Number: 5,183,563
[45] Date of Patent: Feb. 2, 1993

[54] SYSTEM FOR REMOVAL AND DISPOSAL OF MINOR AMOUNTS OF ORGANICS FROM CONTAMINATED WATER

[75] Inventor: John B. Rodden, Sugar Land, Tex.

[73] Assignee: Shell Oil Company, Houston, Tex.

[21] Appl. No.: 686,955

[22] Filed: Apr. 18, 1991

[51] Int. Cl.$^5$ ............................................. C02F 1/20
[52] U.S. Cl. ........................... 210/180; 210/110; 210/181; 210/188; 55/53; 55/159; 55/196; 55/208; 422/173; 422/198
[58] Field of Search ............... 210/170, 180, 181, 188; 55/53, 139, 196, 208; 203/10; 110/211, 236; 422/173, 190, 198, 216, 235

[56] References Cited

U.S. PATENT DOCUMENTS

| | | | |
|---|---|---|---|
| 3,655,048 | 4/1972 | Pergola | 210/67 |
| 3,827,861 | 8/1974 | Zenkner | 23/277 C |
| 3,864,252 | 2/1975 | Morin et al. | 210/59 |
| 3,898,058 | 8/1975 | McGill | 55/50 |
| 3,930,803 | 1/1976 | Winter | 23/277 R |
| 3,960,504 | 6/1976 | Griffin | 23/277 C |
| 4,015,927 | 4/1977 | Culpepper, Jr. | 431/5 |
| 4,048,007 | 9/1977 | Valle-Riestra | 162/57 |
| 4,135,891 | 1/1979 | Borger et al. | 55/59 |
| 4,190,423 | 2/1980 | Winter | 55/20 |
| 4,236,974 | 12/1980 | Kühnlein | 210/182 |
| 4,314,906 | 2/1982 | Dunn et al. | 210/754 |
| 4,377,396 | 3/1983 | Krauss et al. | 55/59 |
| 4,412,924 | 11/1983 | Feather | 210/744 |
| 4,517,094 | 5/1985 | Beall | 210/664 |
| 4,544,488 | 10/1985 | O'Brien | 210/664 |
| 4,758,253 | 7/1988 | Davidson et al. | 55/77 |
| 4,764,272 | 8/1988 | Fox, Sr. | 210/104 |
| 4,844,795 | 7/1989 | Halwani | 210/98 |
| 4,846,934 | 7/1989 | Carborry | 210/181 |
| 4,892,664 | 1/1990 | Miller | 55/53 |
| 4,979,886 | 12/1990 | Rippberger | 55/196 |

FOREIGN PATENT DOCUMENTS 2035814A 6/1980 United Kingdom .

Primary Examiner—Robert A. Dawson
Assistant Examiner—David Reifsnyder

[57] ABSTRACT

A system is disclosed for reducing the level of minor amounts of volatile organic contaminants, from contaminated water, which includes pump means to feed water from the body of contaminated water to the system, a plurality of heating means to raise the temperature of the water, a contact vessel to contact the heated water with gas to strip the volatile contaminants from the water, gas supply means to provide stripping gas to the vessel, and means to pass the removed volatile contaminants to a furnace for disposal by combustion.

4 Claims, 1 Drawing Sheet

SYSTEM FOR REMOVAL AND DISPOSAL OF MINOR AMOUNTS OF ORGANICS FROM CONTAMINATED WATER

BACKGROUND OF THE INVENTION

There are numerous instances where hydrocarbon fuels become mixed with water following leakage from tanks, spills of fuels on the ground and from condensation of moisture within a tank as may occur when the fuel tank is substantially empty.

Modern gasolines are being formulated with increasing amounts of organic oxygenates, such as methyl tertiary butyl ether (mtbe), methyl tertiary amyl ether (tame), and the like. The oxygenates are more soluble in the water than are the traditional hydrocarbon components of the fuels. When water becomes contaminated with minor amounts of these organics it is desirable to remove the organic content so as to negate environmental problems. The greater affinity of the oxygenates for water leads to generally higher concentrations of the oxygenates in water than has historically been found for hydrocarbons and renders separating them from the water to increasingly lower levels mandated by regulations a difficult problem.

A traditional way for treating wastewater contaminated with volatile organics, then, is to contact the wastewater in a stripping column with a gas such as air, as disclosed e.g. in British Patent 2,035,814A. When designing the equipment for a given set of conditions the amount of contaminant that can be removed decreases as the temperature decreases.

When groundwater becomes contaminated with minor amounts of these organics, vast amounts of energy may be required to reduce the organics to a level of less than a few parts per million, and even more energy to achieve levels in the parts per billion range.

It is an object of this invention to provide an energy efficient system having the capability for continuous operation to treat significant quantities of e.g. contaminated groundwater, and to reduce the contamination by oxygenates to environmentally acceptable levels.

It is a further object to dispose of the removed oxygenates in an energy efficient as well as environmentally acceptable matter.

SUMMARY OF THE INVENTION

The invention provides a system for reducing the level of minor amounts of volatile organic contaminants from water containing such contaminants, which includes:
A) water supply means for supplying water to said system and capable of being connected to a supply of water contaminated with minor amounts of volatile organic compounds;
B) first heat exchange means having a first inlet connected to said water supply means, having a first internal volume for heating said contaminated water by indirect heat exchange with hot product water, said internal volume communicating with a first outlet, and also having a second inlet, said second inlet communicating with a second internal volume in heat exchange relation with said first internal volume, and a second outlet communicating with said second internal volume;
C) second heat exchange means disposed in heat exchange relation with a furnace, said second heat exchange means having an inlet connected to the first outlet of said first heat exchange means, and having an outlet;
D) an upright vessel containing packing or trays for contacting contaminated water with a stripping gas, said vessel having a water inlet and a gas outlet each disposed in the upper part of said vessel and having a water outlet and a gas inlet disposed in the lower part of said vessel;
E) a conduit for vessel feed water connecting the outlet of said second heat exchange means to the water inlet of said vessel;
F) a conduit for vessel product water connecting the outlet from said vessel with the second inlet of said first heat exchange means;
G) a conduit connected to the second outlet of said first heat exchange means for passing water having reduced level of volatile organic contaminants from the system;
H) means for supplying gas connected to the gas inlet of said vessel for stripping volatile organic contaminants from water in said vessel; and
I) a conduit for vessel product gas connecting the gas outlet of the vessel to the inlet of said furnace.

The invention further provides a continuous process for reducing levels of volatile organic contaminants in water and disposing of said contaminants which process comprises:
A) supplying water containing-volatile organic contaminants to a first heat exchanger and heating said contaminant-containing water by indirect heat exchange with water having levels of contaminants reduced according to the instant process;
B) passing the heated water from step A) to a second heat exchanger disposed in heat transfer relation with a furnace for further heating the contaminant containing water by indirect heat exchange;
C) stripping the heated contaminated water with air, to obtain hot product water having reduced contaminants and a contaminated air stream;
D) passing said contaminated air stream to the inlet of said furnace and combusting the contaminants in said furnace; and
E) passing the hot product water from step C) to said first heat exchanger to cool the product water.

BRIEF DESCRIPTION OF THE DRAWINGS

The invention will be further explained with reference to the accompanying drawings wherein.

DESCRIPTION OF PREFERRED EMBODIMENTS

The present invention provides an inexpensive and flexible system enabling comparatively low energy costs for remediating water which has been contaminated with oxygenates. The system has the capability to be effective for reducing the levels of contamination in the treated water product to or below levels generally considered to be acceptable for return to the environment.

Figure 1:
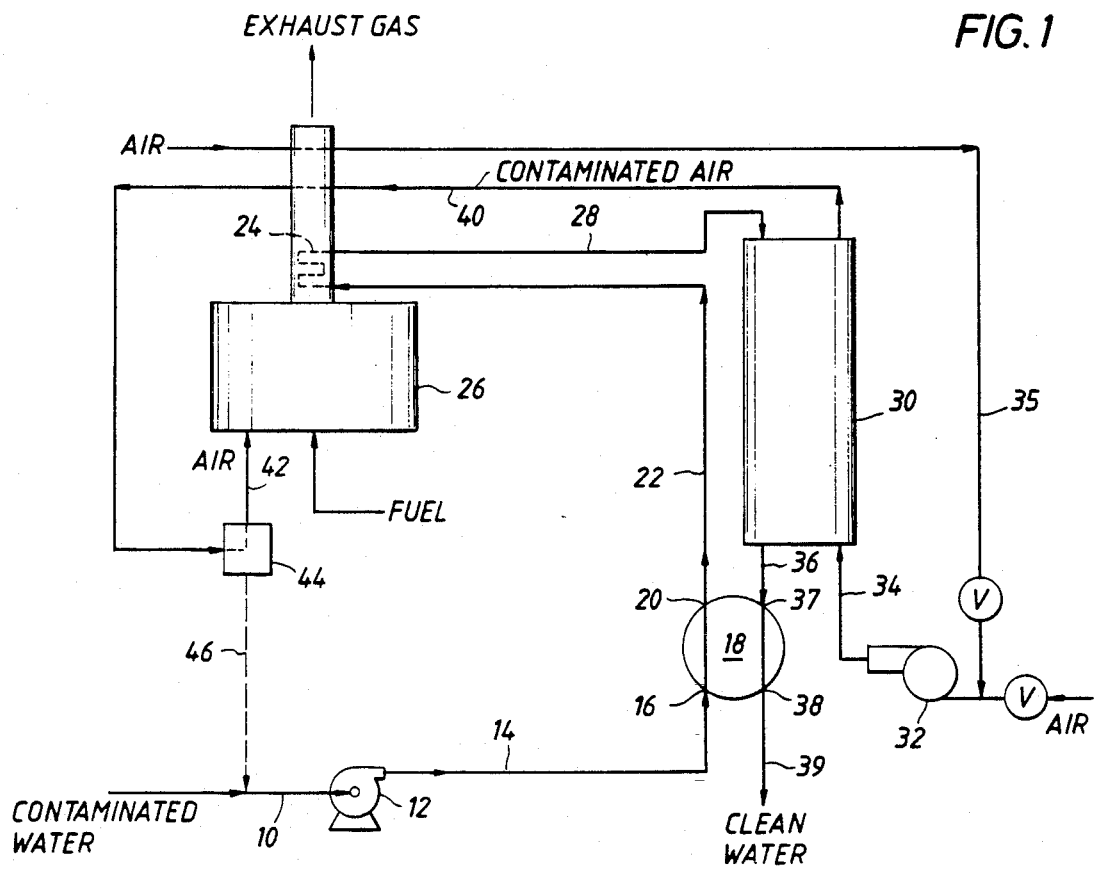
FIG. 1 is a schematic representation of a preferred embodiment of the system of this invention.

Referring now to the drawings, FIG. 1 is a schematic representation of a system embodying this invention, and is provided to show the various functions that will be employed without regard to scale. Contaminated water from a source not shown is fed to the system via line 10 to water supply means, pump 12. The contaminated water passes through conduit 14 to the first inlet 16 of heat exchanger 18 having an internal volume where it is heated by indirect heat exchange with "clean" i.e. decontaminated water product from the system. Any known conventional unfired heat-transfer equipment design, such as a shell and tube exchanger or plate and frame heat exchanger may be used so long as there is no leakage or other commingling of contaminated water into the clean water. The heated water passes from first heat exchanger 18 first outlet 20 through line 22 to second heat exchanger 24 disposed in heat transfer relation to fired furnace 26. Second heat exchanger 24 may be any conventional fired heat-transfer equipment. The furnace is fired at a rate to achieve any desired elevated temperature of the contaminated water. The heated contaminated water is passed from second heat exchanger 24 via conduit 28 to the upper part, and preferably the topmost part of stripping vessel 30.

Stripping vessel 30 may be a trayed column, but preferably is a packed column containing any conventional packing, such as, for example Raschig rings, Lessing rings, Berl saddles, Intalox saddles, Tellerettes, Pall rings and the like, and preferably contains a high surface area packing such as marketed under the trade name JAEGER Tripacks. Generally best results are obtained by the use of tall, small diameter columns. The contaminated heated water flows downwardly through the packing in stripping vessel 30 and countercurrently contacts stripping gas supplied to the bottom of said vessel from gas supply means 32 via line 34.

Gas supply means 32 may comprise any conventional gas supply source such as bottles of nitrogen, carbon dioxide and the like. However, a conventional air blower which can supply clean ambient air as the stripping gas is preferred. In a preferred embodiment an optional valved conduit 35 disposed in heat transfer relation with the hot effluent exhaust from the furnace is connected to the intake of blower 32 for heating at least a part of the air intake to the air blower to have the air entering the stripper at a temperature substantially the same as the temperature of the water to prevent a large drop in temperature during the stripping process. The water, after having the volatile organics stripped out by the stripping gas, is passed from the bottom of stripping column 30 via line 36 to second inlet 37 of first heat exchanger 18 where it is cooled, by transfer of heat by indirect exchange to additional contaminated water passing through said first heat exchanger 18. The "clean" cooled water is passed from first heat exchanger 18, outlet 38 and line 39 for reuse or release to a receiving body of water such as groundwater, a lake, stream or the like.

The stripping gas containing the organics removed from the water is passed from the top of stripping vessel 30 via conduit 40 to the inlet of furnace 26 where the organics are incinerated to carbon dioxide and water which are released to the atmosphere admixed with the furnace flue gas. As will be known to those skilled in the art the stripping gas in line 36 will contain appreciable water vapor.

In a preferred embodiment an optional phase separator 42 also known as a knockout pot is installed to remove any condensed water in line 40 before the stripped gas enters furnace 26. The separated water is passed from phase separator 42 via line 44 and recycled with the feed water entering the system via line 10. In this manner any organics contained therein are disposed of without adverse impact on the environment. In a properly designed system this recycle of separated water would amount to less than about one percent of the fresh contaminated water fed to the system and would not significantly impact either cost of the system or the amount of energy required to operate the process.

The invention will now be illustrated with reference to the following illustrative embodiment.

ILLUSTRATIVE EMBODIMENT

With reference to FIG. 1 contaminated water containing about 20,000 parts per billion (ppb) of mtbe from a surface of groundwater source (not shown) and having a temperature of about 40° F. is connected to the system according to the invention via conduit 10 and is pumped via pump 12 at a rate of 70 gallons per minute (gpm) via conduit 14 to first inlet 16 of unfired heat exchanger 18. The contaminated water is heated by indirect heat exchange to a temperature of about 94° F. and is passed via first exchanger outlet 20 and line 22 to second heat exchanger 24 which is heated by furnace 26 having a rating of about 780,000 BTU/hr. The contaminated water is heated to a temperature of about 113° F. and is passed via line 28 to the top of stripping vessel 30. Stripping vessel 30 is a conventional packed column filled with a packing commerically available under the trade name JAEGER Tripacks. The stripping vessel will preferably have a height to diameter ratio above about 7, e.g. a packing height of about 30 ft. and a diameter of about 2 ft. The water passes downwardly in stripping vessel 30 in countercurrent flow to air flow of 500 standard cubic feet per minute (scfm) fed to the bottom of stripping vessel 30 via line 34 from air blower 32. The ambient air has a temperature of about 32° F. and the effect of contact and stripping is that the water has been cleaned, i.e. has substantially reduced levels of mtbe on the order of about 50 ppb or less and the temperature is lowered on the order of about 5° F. to about 108° F. The clean water is passed from stripping vessel 30 via conduit 36 to second inlet 37 of first heat exchanger 18 where the temperature is lowered to about 54° F. and is passed via second outlet 38 of first heat exchanger 18 and line 39 for use or return to groundwater.

The air now contaminated with the volatile organics stripped from the water exits stripper vessel 30 and is carried by conduits 40 and 42 to the inlet of furnace 26 where it serves as part of the oxidant, and the volatile organics are incinerated to harmless carbon dioxide and water vapor. Preferably, the contaminated air in lines 40 and 42 is passed through optional phase separator 44 to separate any entrained water which in this embodiment would be less than about 0.3 gpm, and the separated water, which will still contain some volatile organics, is passed through valved conduit 46 and line 10 to recycle to the system.

As an alternate embodiment line 40 is disposed in heat transfer relation to the exhaust gas from furnace 26 as shown, whereby less fuel will be required to heat the furnace to a temperature of 1400° to 1600° F. for a period of about one-half second, to ensure destruction of the stripped contaminates entering the furnace with the air supplied via lines 40 and 42.

Figure 2:
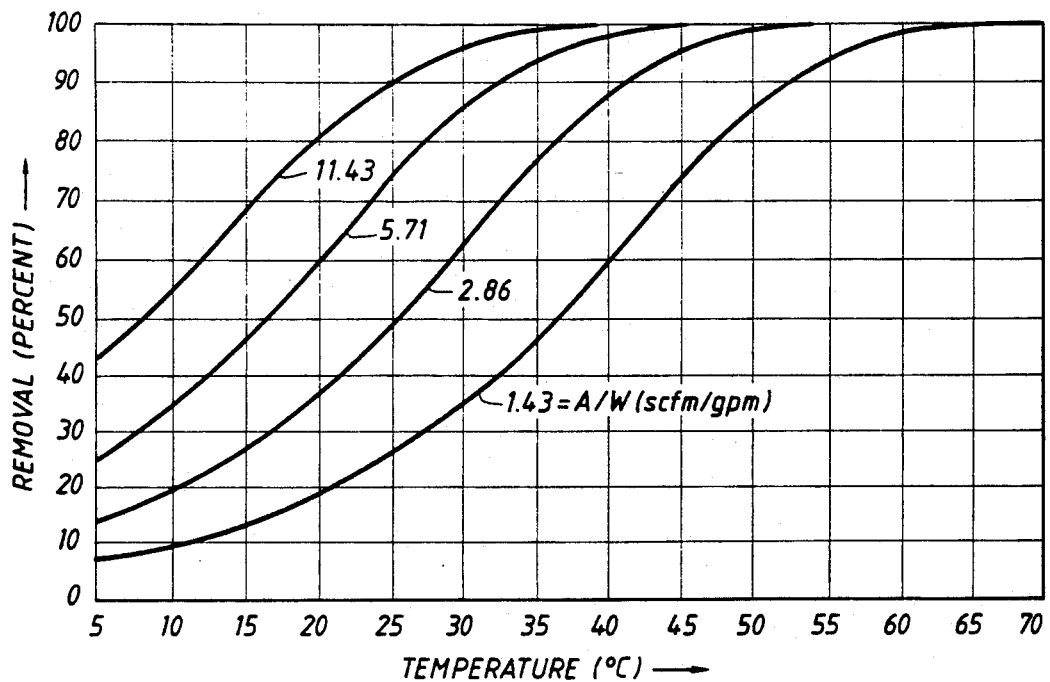
FIG. 2 is a graph comparing the removal of methyl tertiary butyl ether from water containing 0.5 per cent by weight of said ether at various rates of stripping air to water flow and the influence of temperature on the removal rate as well.

It is an advantage of the system of the invention that it provides flexibility to minimize the thermal and electrical energy required to remediate water contaminated with volatile organics to clean i.e. environmentally acceptable condition. FIG. 2 graphically compares the calculated effect of different air to water ratios for air stripping mtbe from water heated to different temperature in a stripping column having a diameter of 2 ft. and having a packed height of 15 ft. with 2-inch JAEGER Tripack packing. With the instant system it is possible to optimize the the thermal and electrical input to achieve the desired results for any particular contaminated feed, recognizing that part of the thermal energy input is obtained from the removed contaminants.

What is claimed is:

1. A system for reducing the level of minor amounts of volatile organic contaminants from water containing such contaminants, which includes:
   A) water supply means for supplying water to said system and capable of being connected to a supply of water contaminated with minor amounts of volatile organic compounds;
   B) first heat exchange means having a first inlet connected to said water supply means, having a first internal volume for heating said contaminated water by indirect heat exchange with hot product water, said first internal volume communicating with a first outlet, and also having a second inlet, said second inlet communicating with a second internal volume in heat exchange relation with said first internal volume, and a second outlet communicating with said second internal volume;
   C) second heat exchange means disposed in heat exchange relation with a furnace, said second heat exchange means having an inlet connected to the first outlet of said first heat exchange means, and having an outlet;
   D) a upright vessel containing packing or trays for contacting contaminated water with a stripping gas, said upright having a water inlet and a gas outlet each disposed in the upper part of said upright vessel and having a water outlet and a gas inlet disposed in the lower part of said upright vessel;
   E) a conduit for vessel feed water connecting the outlet of said second heat exchange means to the water inlet of said upright vessel;
   F) a conduit for vessel product water connecting the outlet from said upright vessel with the second inlet of said first heat exchange means;
   G) a conduit connected to the second outlet of said first heat exchange means for passing water having reduced level of volatile organic contaminants from the system;
   H) means for supplying gas connected to the gas inlet of said upright vessel for stripping volatile organic contaminants from water in said upright vessel; and
   I) a conduit for vessel product gas connecting the gas outlet of the vessel to the inlet of said furnace.

2. System as in claim 1 having in addition:
   J) a phase separation vessel operatively connected on element I) for separating any entrained water from the vessel product gas prior to the inlet of said furnace.

3. System as in claim 2 having in addition:
   K) a conduit for separated water connecting element J) to the inlet of element A).

4. System as in claim 1 having in addition:
   L) a valved conduit disposed in heat transfer relation with the furnace, said valved conduit having an inlet and having an outlet connected to said inlet for means for supplying gas, element H), for supplying heated gas for stripping.

* * * * *